(No Model.)

F. A. EVELETH.
DEVICE FOR MAKING CART SADDLES.

No. 288,933. Patented Nov. 20, 1883.

Attest
Edward Stu:
Geo. W. Wheelock.

Inventor
Frederick A. Eveleth
by Knight Bros Atty's.

UNITED STATES PATENT OFFICE.

FREDERICK A. EVELETH, OF CYNTHIANA, KENTUCKY.

DEVICE FOR MAKING CART-SADDLES.

SPECIFICATION forming part of Letters Patent No. 288,933, dated November 20, 1883.

Application filed September 26, 1883. (No model.)

*To all whom it may concern:*

Be it known that I, FREDERICK A. EVELETH, of Cynthiana, Harrison county, Kentucky, have invented a new and useful Device for Making Cart-Saddles, of which the following is a specification.

My invention relates to means for padding cart-saddles, by which a better article can be produced with greater ease and by a comparatively unskilled hand.

Figure 1:
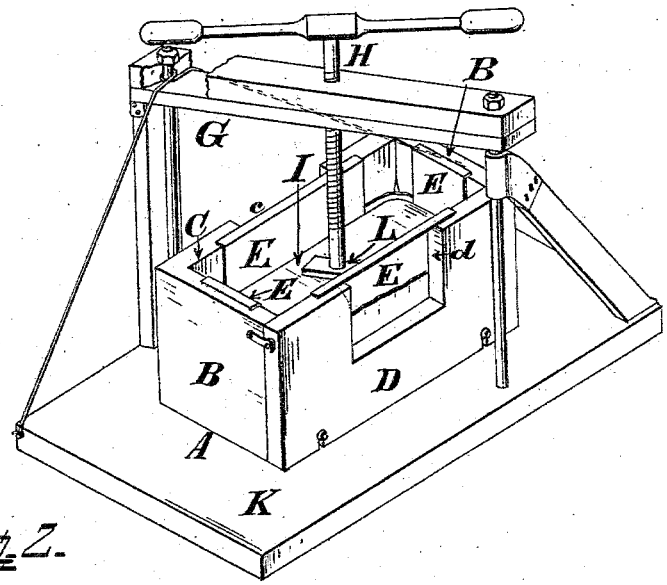
Figure 2:
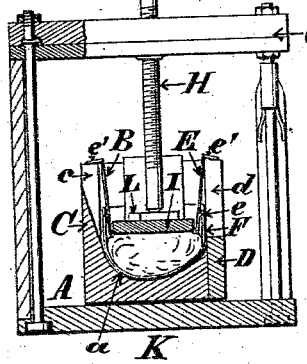
Figure 3:
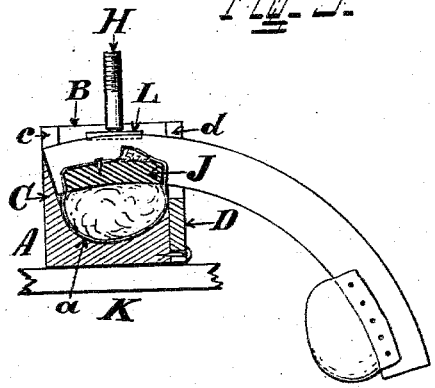
Figure 4:
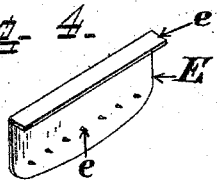

In the accompanying drawings, Figure 1 represents by perspective view, and Fig. 2 by vertical section, my machine employed in the preliminary operation of compacting the pad-contents before the application of the tree. Fig. 3 represents a tree and pad in place within the box. Fig. 4 shows one of the temples or stretchers detached.

A is a molding block or box, which has a concave depression, $a$, of counterpart form to that desired to be given to the pad. B B are end walls of said box, of which C is the rear and D is the front wall. These walls inclose a space which corresponds to the desired dimensions of the pad. Notches $c$ and $d$ in said rear and front walls, respectively, allow insertion of the tree, as shown in Fig. 3.

E are temples, stretchers or grip-plates, of which each is armed with a row of spurs, $e$, to engage in the substance of the leather covering of the pad. Each plate has a lip, $e'$, to enable the temple or stretcher to be engaged over the tops of the walls B B C D.

F represents a piece of covering-leather, which is applied in a flaccid condition.

G is a gallows-frame provided with a screw, H, by which either a follower, I, or the tree J itself may be pressed down upon the mass of cow-hair or other stuffing employed. The said gallows-frame is attached to a base, K, upon which the hollowed block A rests. A shoe or foil, L, prevents the screw H indenting the substance of the tree.

The operation is as follows: The screw-press follower I being elevated, a piece of leather, F, of proper dimensions, is laid in the block-cavity $a$, and the temples or stretchers E, being engaged by their spurs $e$ in the substance of the leather near its edges, are hung by means of their lips $e'$ on the tops of the walls B B C D. Cow-hair or other stuffing being deposited in sufficient quantity and properly disposed within the leather, the follower I is depressed by means of the screw H, as shown in Figs. 1 and 2, until the stuffing has been properly molded and compacted. The follower is then withdrawn, and the tree being laid with one of its cants upon the mass of stuffing, the pressure of the screw H is brought to bear upon the tree. The edges of the leather are then disengaged from the temples or stretchers, and, being drawn over the back of the cant, are tacked down firmly thereupon, as partially shown in Fig. 3. Lever or other power may be employed in place of the screw, and be worked by either manual or steam power.

I claim as new and of my invention—

The implement for padding cart-collars, consisting of mold A, having walls B B C D, which are notched, as at $c\ d$, in the described combination with screw-press G H and temples or stretchers E, substantially as and for the purpose set forth.

In testimony of which invention I hereunto set my hand.

FREDERICK A. EVELETH.

Attest:
CARL SPENGEL,
JOHN A. PENN.